United States Patent Office 3,849,356
Patented Nov. 19, 1974

3,849,356
MIXTURE FOR MAKING A MOLD

Akio Matsui, Funabashi, Yuji Hasegawa, Chiba, and Hiroshi Fujimoto, Funabashi, Japan, assignors to Kawasaki Jukogyo Kabushiki Kaisha, Ituka-ku, Kobe-shi, Hyogo-ken, Japan
No Drawing. Continuation of application Ser. No. 221,104, Jan. 26, 1972, which is a continuation-in-part of application Ser. No. 94,599, Dec. 2, 1970, both now abandoned. This application Sept. 11, 1973, Ser. No. 396,315
Claims priority, application Japan, Dec. 5, 1969, 44/98,030
Int. Cl. C08g 51/24
U.S. Cl. 260—29.3               5 Claims

ABSTRACT OF THE DISCLOSURE

A self-hardening fluid mixture of the water glass type for making a mold comprises a refractory material in powder form, water glass as binder, hardening agent, surface active agent as foaming agent, metallic aluminum in powder form serving as an exothermic agent and some water. A small amount of novolak-type phenol resin is incorporated in the mixture for the purpose of retarding the reaction between the water glass and the aluminum powder while rapidly destroying bubbles formed by the surface active agent. Expansion of the mold during the exothermic reaction is thereby avoided.

CROSS-REFERENCE TO PRIOR APPLICATION

This is a continuation of application Ser. No. 221,104, filed Jan. 26, 1972, which in turn is a continuation-in-part of application Ser. No. 94,599, filed Dec. 2, 1970, both now abandoned.

FIELD OF INVENTION

This invention relates to mixtures for making molds, and more particularly, to an improved fluid mixture of the water glass type.

BACKGROUND INFORMATION

Increased attention has in recent years been drawn to fluid molds comprising a refractory material in particle form, binder, hardening agent, foaming agent and some water. The reason for this is that the number of processing steps required for the production of such molds is greatly reduced. Heretofore, self-hardening fluid mixtures of the water glass type of the prior art have required the presence of water for making the mixtures flowable, while mixtures for making self-hardening molds of the ordinary type have required no water. This has made it necessary to at least partially dry the mixtures during their production so as to reduce the quantity of residual water in the molds. Conventional fluid molds made from conventional mixtures thus have the disadvantage that their production requires an additional operational step, to wit a drying step, while by contrast conventional self-hardening molds of the ordinary type do not require drying.

SUMMARY OF INVENTION

This invention provides a fluid mixture of the water glass type for making molds which permits elimination of the drying step required in the production of conventional fluid molds. Generally, it is known that, when aluminum in powder form is added to a mixture of a refractory material in particle form and water glass, the following exothermic chemical reactions take place:

$$Na_2SiO_3 + H_2O \rightleftarrows H_2SiO_3 + NaOH \quad (1)$$

$$2NaOH + 2Al + 2H_2O \rightleftarrows 2NaAlO_2 + 3H_2 \quad (2)$$

$$2NaAlO_2 + 4H_2O \rightleftarrows 2NaOH + 2Al(OH)_3 \quad (3)$$

When a fluid mold is made by further adding water and a surface active agent to the aforementioned mixture, hydrogen gas is produced by the reaction of equation (2) immediately after the additives and mixture are kneaded together. Since bubbles formed by the surface active agent in the kneaded mixture do not disappear readily, the mold has no air permeability, so that the hydrogen gas produced tends to move the bubbles in the mixtures outwardly of the mold. As a result, the mold is expanded and becomes porous. Such being the case, molds made by using a convenional mixture have low strength and are unsatisfactory when put to practical use.

The present invention has as its object to provide a fluid mixture of the water glass type for making a mold which obviates the aforementioned disadvantage inherent in conventional mixtures. Briefly, pursuant to the invention a small amount of a novolak-type phenol resin is incorporated in a conventional mixture for the purpose of delaying or retarding the reaction between the water glass and the aluminum in powder form for a certain period of time while, however, rapidly destroying bubbles formed by the surface active agent in the mixture, so that the reaction between the powdered aluminum and the water glass takes place after the air permeability of the mold made from the mixture attains a high value of 1,000. The addition of the novolak-type phenol resin is effective to prevent the expansion of the mold. Due to the exothermic reaction of the mixture, the residual water content in the mold is at the same time markedly reduced. The presence of residual water constitutes an important problem in the production of fluid molds of the prior art.

A mixture for making a mold pursuant to this invention, thus, comprises the following ingredients:

(1) A novolak-type phenol resin;
(2) A conventional particulate refractory material, such as sand;
(3) Water glass which acts as binder;
(4) Aluminum in powder form which serves as exothermic agent;
(5) A conventional hardening agent such as, for example, portland cement, slaked lime, alumina cement or mixtures thereof;
(6) A surface active agent which acts as foaming agent; and
(7) Water.

The novolak-type phenol resin of (1) should be present in amounts of about between 0.1 to 1% by weight. It has been found that excellent results are obtained with a novolak resin, in the manufacturing process of which about 11% by weight of hexamine is used and which has a melting point in the range of from 78° C. to 88° C. and a gel time of 50 to 80 seconds at 140° C. Novolak resins are discussed on pp. 10–20 of "Phenolic Resins" by A. A. K. Whitehouse, E. G. K. Pritchett and G. Barrett, published in 1967 for the Plastics Institute by Iliffe Books Ltd. Any kind of novolak-type phenol resins as known in the art may be used. However, other phenol resins which are not of the novolak type are unsuitable for the purposes of the present invention.

The water glass used in accordance with the invention may, for example, be as follows:

| | |
|---|---|
| Water _____ percent __ | 67 |
| Solid content _____ do ____ | 33 |
| Mol ratio _____ | 2.0 |

Generally, water glass with a solid content of between about 30–60% by weight is preferred. The indicated solid content, however, is not critical and different solid contents, such as known in the art, may be employed.

In respect of the surface acting agent which acts as foaming agent, it has been found that polyoxyethylene-alkylethersulphates are suitable surfactants for the inventive purposes but there is no criticality in the use of these surfactants which may readily be replaced by other prior art surfactants previously used for mixtures of the indicated kind.

A mixture for making a mold according to this invention renders it possible to make a self-hardening fluid mold of the exothermic type which attains high strength in a short period of time and which contains a minimum amount of residual water therein. This is in contrast to conventional fluid molds of the non-exothermic type. In accordance with the invention, expansion of the mold caused by hydrogen gas produced by the reaction between the water glass and the aluminum powder is successfully prevented.

The ingredients of the inventive mixture may be present in the following ranges:

| | Parts (weight) |
|---|---|
| (1) Particulate refractory material (quartz sand, olivine sand, etc.) | 100 |
| (2) Binder (water glass with 30–60% by weight solid content—mol ratio, 2.0) | 4–8 |
| (3) Exothermic agent (99% aluminum in powder form) | 0.2–1.0 |
| (4) Hardening agent (e.g. Portland cement) | 0–1.0 |
| (5) Hardening agent (e.g. alumina cement) | 0–3.0 |
| (6) Auxiliary exothermic agent (slaked lime) | 0.2–1.0 |
| (7) Reaction inhibiting and bubble destroying agent (phenol resin of the novolak type) | 0.1–1.0 |
| (8) Foaming agent (non-ionic·anionic surface acting agent, for example polyoxyethylenealkylethersulphate) | 0.1–0.3 |

The invention will now be described by a number of examples. It should be understood, however, that these examples are given by way of illustration and not by way of limitation and that many changes may be effected without affecting the scope and spirit of the invention as recited in the appended claims.

EXAMPLE 1

Ingredients of mixture:

| | Parts (weight) |
|---|---|
| (1) Beach Sand No. 4 (JIS) | 100 |
| (2) Water glass (mol ratio, 2.0), solid content about 33% | 6 |
| (3) Aluminum in powder form (purity, 99%) | 0.7 |
| (4) Portland cement | 0.5 |
| (5) Slaked lime | 0.5 |
| (6) Novolak-type phenol resin of Example 4 | 0.35 |
| (7) Non-ionic·anionic surface active agent (polyoxyethylenealkylethersulphate) | 0.20 |
| (8) Water | 3.0 |

The nature and properties of a mold made from the aforementioned composition are shown in Table 1.

TABLE 1

| Time the mold is allowed to stand | Resistance to pressure (kg./cm.$^2$) | Air permeability | Water content (percent) |
|---|---|---|---|
| Hours: | | | |
| ¼ | 2.0 | 300 | 4.3 |
| ½ | 5.6 | 1,000 | 4.0 |
| 1 | 6.9 | 1,100 | 3.8 |
| 24 | 8.5 | 1,200 | 2.7 |

NOTE.—Temperature, 10° C.

The fluid value was obtained by dividing the spreading D mm. of the mixture by the height $h$ mm. of the central portion of the mixture when 2 liters of fluid sand were dropped from a height of 400 mm. through a nozzle of 50 mm. in diameter. The value obtained was $D/h = 5.5$.

As can be seen from the results, the mixture began to produce heat in about 10 minutes after it was formed into a mold and attained a maximum temperature of 80° C. in 30 minutes. The strength of the mold at that time was 5.6 kg./cm.$^2$. It will be noted that a mold made from the mixture according to this invention hardens much more quickly and attains higher strength values in a shorter time than self-hardening fluid molds of the non-exothermic type.

EXAMPLE 2

Ingredients of mixture:

| | Parts (weight) |
|---|---|
| (1) Beach Sand No. 4 (JIS) | 100 |
| (2) Water glass (mol ratio, 2.0, solid content about 33%) | 6 |
| (3) Aluminum (purity, 99%) in powder form | 0.7 |
| (4) Alumina cement | 3 |
| (5) Slaked lime | 0.5 |
| (6) Novolak-type phenol resin of Example 4 | 0.35 |
| (7) Non-ionic·anionic surface active agent, as in Example 1 | 0.20 |
| (8) Water | 3.0 |

The nature and properties of a mold made from the aforementioned composition are shown in Table 2.

TABLE 2

| Time the mold is allowed to stand | Resistance to pressure (kg./cm.$^2$) | Air permeability | Water content (percent) |
|---|---|---|---|
| Hours: | | | |
| ¼ | 3.0 | 400 | 4.0 |
| ½ | 7.1 | 1,100 | 3.8 |
| 1 | 8.2 | 1,300 | 3.2 |
| 24 | 13.4 | 1,500 | 2.0 |

NOTE.—Temperature, 10° C.

The value of fluidity determined in the same manner as in Example 1 was $D/h = 6.0$.

Unlike portland cement (SiO$_2$, 20 to 26%; CaO, 50 to 66%; Al$_2$O$_3$, 4 to 10%; Fe$_2$O$_3$, 2 to 5%; MgO, 1 to 2% and SO$_3$, 1 to 3%), alumina cement (Al$_2$O$_3$, 40 to 75%; CaO, 25 to 40% and SiO$_2$, 0.5 to 3%) does not interfere with the fluidity of the mixture even if it is added in large proportions. The use of alumina cement in place of portland cement thus made it possible to add a greater amount of hardening agent in Example 2 than in Example 1 and to provide a mold which was much more fluid and which had higher strength values in 15 minutes and 24 hours. The heat produced by the mold of Example 2 reached 85° C.

EXAMPLE 3

Ingredients of mixture:

| | Parts (weight) |
|---|---|
| (1) Beach Sand No. 4 (JIS) | 100 |
| (2) Water glass (mol ratio, 2.0, solid content about 40%) | 6 |
| (3) Aluminum (purity, 99%) in powder form | 0.7 |
| (4) Powder having dicalcium silicate as chief composition | 3 |
| (5) Slaked lime | 0.5 |
| (6) Novolak-type phenol resin of Example 4 | 0.35 |
| (7) Non-ionic·anionic surface active agent as in Example 1 | 0.20 |
| (8) Water | 3.0 |

The nature and properties of a mold made from the aforementioned composition are shown in Table 3.

TABLE 3

| Time the mold is allowed to stand | Resistance to pressure (kg./cm.$^2$) | Air permeability | Water content (percent) |
|---|---|---|---|
| Hours: | | | |
| ¼ | 2.5 | 350 | 4.1 |
| ½ | 6.2 | 1,050 | 3.9 |
| 1 | 7.3 | 1,200 | 3.6 |
| 24 | 12.2 | 1,300 | 2.3 |

NOTE.—Temperature, 10° C.

The value of fluidity determined in the same manner as in Example 1 was $D/h=6.0$.

From the examples described above, it will be appreciated that self-hardening fluid molds of the exothermic type attain higher strength values in a shorter period of time and the residual water contained in them is reduced more quickly than in self-hardening fluid molds of the non-exothermic type. Further, the molds of the exothermic type attain a very high value for air permeability in a short interval of time due to the pressure of phenol resin in the mixture and the heat produced by the reaction of the mixture. It has been ascertained that it is possible to pour molten metal into molds made from mixtures according to this invention about 2 hours after the molds are formed, without requiring drying of the molds. This greatly increases the productivity of fluid molds which has hitherto been impossible to attain in the case of fluid molds of the non-exothermic type. The fact that the mixtures according to this invention contain aluminum and novolak-type phenol resin renders the mixtures more readily removable from the cast produced after hardening as compared to other mixtures of the water glass type, thereby contributing to the increase of productivity of the cast produced.

EXAMPLE 4

The following results were obtained in experiments made for the evaluation of the effectiveness of the novolak-type phenol resin—which was prepared from phenol and formaldehyde using 11% by weight of hexamine—on the foam destroying effect as well as on the retardation of the reaction of the metallic aluminum powder with water glass having a mole ratio of $SiO_2$ to $Na_2O$ of 2.0 and a solid content of 33%, both incorporated in a fluid self-hardening mixture for making foundry molds.

The mixture tested have the same composition as that used in Example 2 except that the amount of the novolak-type phenol resin added was varied as appears in the following table.

TABLE 4

The effect of the novolak-type phenol resin to be used according to the present invention on the foam control as well as on the retardation of the reaction of metallic aluminum with water glass

| Amount of phenol resin | Air permeability of foamy mixture after 1 hr. (ml. of air/min.) | Time required until the mixture temp. reaches 50° C. (in minutes) |
| --- | --- | --- |
| Parts by weight: | | |
| 0 | 0 | 10 |
| 0.2 | 450 | 30 |
| 0.3 | 1,200 | 55 |
| 0.4 | 1,200 | 90 |

As previously stated, the novolak-type phenol resin is added to the mixture for the purpose of inhibiting the reaction between the water glass and the aluminum powder for a certain period of time while rapidly destroying bubbles which are formed by the surface active agent in the mixture. In this manner the reaction between the aluminum powder and the water glass takes place after the air permeability of the mold made from the mixture attains a high value. Further, the addition of the novolak-type phenol resin is effective to prevent the expansion of the mold while at the same time markedly reducing the amount of residual water in the mold which constituted a serious problem in prior art mixtures.

It has previously been proposed to add other kinds of phenol resins for mold mixtures for the purpose of binding the mixture on heating and to harden the binder. However, this effect does not take place in the present mixture, since the temperature rises up to about 80° C. to 90° C. at the most, due to the presence of aluminum in powder form. Novolak-type phenol resins cannot serve as binder material in such a temperature range, since usually temperatures up to 300° C. are required to render effective low temperature binders. By contrast, in the present mixture water glass is used as binder which is effective at the relatively low temperatures which are used in processing the inventive mixture.

In processing the inventive mixtures, any drying process is entirely omitted due to the exothermic reaction of the aluminum with the water glass.

What is claimed is:

1. In a mixture for making a self-hardening fluid mold comprising a refractory material in powder form, water glass, a hardening agent selected from the group consisting of portland cement, slaked lime, alumina cement or mixtures thereof, surface active agent, about 0.20 to 1.0% by weight of powdered aluminum, and water, the improvement which comprises that the mixture additionally contains about 0.1 to 1.0 part by weight of a novolak phenol resin having a gelation time of from 50 to 80 seconds at 140° C., per 100 parts by weight of the refractory material.

2. The mixture of claim 1, wherein the aluminum in powder form amounts to 0.6 to 0.8 part by weight and the novolak phenol resin to 0.3 to 0.4 part by weight.

3. A mixture as claimed in claim 1, wherein the surface active agent is polyoxyethylenealkylether sulphate.

4. A mixture as claimed in claim 1, wherein the novolak phenol resin is prepared from phenol and formaldehyde in the presence of about 11% by weight of hexamine.

5. The mixture of claim 1 wherein the water glass has a solid content of about 30–60% by weight.

References Cited

UNITED STATES PATENTS

| 3,234,159 | 2/1966 | Cooper | 260—29.3 |
| 3,537,869 | 11/1970 | Proell | 106—95 |
| 2,952,553 | 9/1960 | Ilenda et al. | 106—38.3 |

FOREIGN PATENTS

| 838,050 | 6/1960 | Great Britain | 106—38.35 |
| 1,162,519 | 8/1969 | Great Britain | 106—38.35 |

LORENZO B. HAYES, Primary Examiner

U.S. Cl. X.R.

106—38.35, 76, 78, 84; 260—38